US007059520B1

(12) United States Patent
Shtesl

(10) Patent No.: US 7,059,520 B1
(45) Date of Patent: Jun. 13, 2006

(54) UNIVERSAL CREDIT CARD INTEGRATED WITH CELLULAR TELEPHONE

(76) Inventor: Joel Shtesl, 237 Hooper St., Brooklyn, NY (US) 11211

( * ) Notice: Subject to any disclaimer, the term of this patent is extended or adjusted under 35 U.S.C. 154(b) by 0 days.

(21) Appl. No.: 11/082,542

(22) Filed: Mar. 17, 2005

(51) Int. Cl.
*G06K 19/06* (2006.01)

(52) U.S. Cl. ...................... 235/449; 235/493

(58) Field of Classification Search ............... 235/493, 235/449, 492, 487, 486, 380, 375, 383, 381; 204/450, 600, 606; 379/211.01, 114.01
See application file for complete search history.

(56) References Cited

U.S. PATENT DOCUMENTS

| | | | |
|---|---|---|---|
| 4,443,027 A | 4/1984 | McNeely et al. | |
| 4,593,936 A | 6/1986 | Opel | |
| 4,700,055 A | 10/1987 | Kashkashian, Jr. | |
| 5,276,311 A | 1/1994 | Hennige | |
| 5,326,964 A | 7/1994 | Risser | |
| 5,530,232 A | 6/1996 | Taylor | |
| 6,138,917 A | 10/2000 | Chapin, Jr. | |
| 6,189,787 B1 | 2/2001 | Dorf | |
| 6,243,574 B1* | 6/2001 | McGregor et al. ......... 455/418 |
| 6,402,029 B1 | 6/2002 | Gangi | |
| 6,494,367 B1 | 12/2002 | Zacharias | |
| 6,505,772 B1 | 1/2003 | Mollett et al. | |
| 6,631,849 B1 | 10/2003 | Blossom | |
| 6,732,919 B1 | 5/2004 | Macklin et al. | |
| 6,742,704 B1 | 6/2004 | Fitzmaurice et al. | |
| 6,753,999 B1* | 6/2004 | Zehner et al. ......... 359/296 |
| 2002/0003169 A1 | 1/2002 | Cooper | |
| 2002/0026419 A1 | 2/2002 | Maritzen et al. | |
| 2002/0029191 A1 | 3/2002 | Ishibashi et al. | |
| 2002/0170975 A1 | 11/2002 | Kawano et al. | |
| 2002/0174016 A1 | 11/2002 | Cuervo | |
| 2003/0011868 A1* | 1/2003 | Zehner et al. ......... 359/296 |
| 2003/0150913 A1 | 8/2003 | Hosogoe et al. | |
| 2003/0194071 A1* | 10/2003 | Ramian ................. 379/114.19 |
| 2004/0066273 A1* | 4/2004 | Cortina et al. ............ 340/5.1 |
| 2004/0240653 A1* | 12/2004 | Ramian ................. 379/201.02 |
| 2005/0054438 A1* | 3/2005 | Rothschild et al. ......... 463/29 |
| 2006/0003815 A1* | 1/2006 | Itoh et al. ............... 455/569.1 |
| 2006/0045244 A1* | 3/2006 | New ...................... 379/93.12 |

FOREIGN PATENT DOCUMENTS

| EP | 1170685 A2 | 1/2002 |
|---|---|---|
| FR | 2786900 | 6/2000 |
| WO | WO 03/010701 A1 | 2/2003 |

OTHER PUBLICATIONS

Chameleon Card: Simmons' Universal Credit Card?, www.technovelgy.com, printed on Nov. 9, 2004.

* cited by examiner

*Primary Examiner*—Thien M. Le
(74) *Attorney, Agent, or Firm*—Steven Horowitz

(57) ABSTRACT

A universal credit card with a cellular telephone that has inside of an outer housing and adjacent to a side thereof a magnetic reader/writer capable of reading data from a magnetic strip of a credit card. Along a side of the outer housing adjacent the magnetic reader/writer is a wide and deep enough slit to swipe the credit card. When a template credit card is swiped through the slit, a magnetic strip of the template credit card reads or writes data from at least one credit card that the user selected on the telephone's keypad from a plurality of credit cards whose data had been entered into memory. A controller and software operate the magnetic reader/writer the user's keypad selection. Alternatively, there is a slot in the outer housing rather than a slit, and insertion and/or removal of a credit card in the slot constitutes swiping the credit card.

26 Claims, 4 Drawing Sheets

UNIVERSAL CREDIT CARD INTEGRATED WITH CELLULAR TELEPHONE

FIELD OF THE INVENTION

The field of this invention is universal credit cards, and more particularly, a method and apparatus for a universal credit card integrated with a cellular telephone

BACKGROUND OF THE INVENTION AND DISCUSSION OF THE PRIOR ART

Retail purchases by consumers using credit cards at a retail establishment involves the simple task of swiping the credit card, which contains a magnetic strip, through the card reader machine that the cashier/clerk in the store maintains. This requires consumers to have to carry around many credit cards, either because the consumers has several different credit lines, or because the consumer maintains a separate credit card or debit card unique to each of numerous retail establishments.

This is a well known problem in that it causes bulky wallets. It causes loss of time by the consumer in fumbling through a thick wallet of cards to pluck out the single card needed for a transaction. Since such transactions occur many times a day, this is a significant drawback. Another drawback is the danger and inconvenience of loss or theft of any of the multiplicity of credit or debit cards carried by the consumer. Cards that are stolen or lost contain basic identification data on the face of the card.

Furthermore, newly issued credit cards are typically mailed to the consumer and this fact alone can result in theft or loss of the card. People receive huge amounts of mail nowadays including numerous offers concerning credit cards, to the point where the consumer might not even properly keep track of the offers and which cards or "preapproved" cards came when. People actually throw out unopened mail due to this burden. Or a busy consumer with a stack of mail might simply forget he or she applied for a credit card and throw out the mail containing the card without opening it. Alternatively, a busy consumer with significant family responsibilities coming home from work might open an envelope containing a newly issued credit card and then place its contents into a stack of other recently received mail in the kitchen with the intent to go through all the mail later and "take care" of the newly issued card at that time. Someone such as a housekeeper can see and take such a card. Furthermore, the consumer might not realize it was taken since he or she has so many other cards and so much other mail. Alternatively, the consumer might set aside the envelope without opening it with the intention of opening it later and then again the mail can be taken.

Several attempts to solve the problems caused by the proliferation of credit cards, debit cards and other plastic used for transactions have been presented in the prior art. For example, U.S. Pat. No. 5,530,232 to Taylor is a multiapplication data card that has two modes. In the first mode, a smart card is used comprising a memory with multiple storage areas to cover at least two authorized applications of the card. In the second mode, the card is a conventional credit card that when presented to a cashier, is swiped in the store's card reader and a selection is made by the user, at that point, of which credit card or financial institution's data should be used. This involves changing the card reader commonly found at the check-out counter of stores to accommodate the ability to select which credit card you want to invoke and to link the system to the data source. It also requires retraining or educating store personnel as to the new system.

In U.S. Pat. No. 4,700,055 to Kashkashian, a system enables a user to carry one credit card instead of many. The information pertaining to each credit card account is encoded on the card by magnetic means with a semiconductor memory device and a microprocessor based system accepts the card and determines whether the credit card account selected for use by the owner is valid. This system involves significant changes to the card reader In U.S. Pat. No. 6,402,029 to Gangi, a method is presented involving writing additional data either to a blank magnetic card or to an existing magnetic striped card to consolidate information from multiple credit cards to a single card. The method uses several tracks of data on one universal card but requires a card reader or software to be designed that will look for the data bracketed by special control codes.

U.S. Pat. No. 4,593,936 to Opel discloses a universal credit card having an array of dots and after a card imprint is made, a number corresponding to the proper credit line desired is manually entered onto the charge slip in the array of dots imprinted from the universal credit card. This requires additional manual steps and changes in the method of the store clerk.

www.technovelgy.com discloses a "Chameleon Card" that supposedly functions as a universal credit card but it requires carrying around a "Pocket Vault" to store the information on the user's regular credit cards. Each time the user desires to use the universal credit card for a different credit card, the user has to swipe it through the Pocket Vault in order to put the appropriate information in place.

What is needed is a method and apparatus for operating a universal credit card that does not require the retail establishments to design special or new magnetic card readers or to change the way the store personnel behave. It is also important to have such a method and apparatus that does not require carrying around any new or bulky device.

SUMMARY OF THE PRESENT INVENTION

An all in one or universal credit card that relies on a cellular telephone of the kind having a keypad, an outer housing and a computer system comprises the cellular telephone that has inside of an outer housing and adjacent to a side thereof a magnetic reader/writer capable of reading data from a magnetic strip of a standard-width credit card. In one preferred embodiment, running along a side of the outer housing adjacent the magnetic reader/writer is a slit having a width at least equal to a standard width of a credit card and a sufficient depth so that the credit card can be inserted into the slit in a manner that places the magnetic strip of said credit card beyond a vertical border of an inside wall at the side of the outer housing. A template credit card has a magnetic strip capable of storing and deleting data from at least one credit card that the user selects on the keypad from a plurality of credit cards whose data had been entered into the memory of the computer system of the telephone, when the template credit card is swiped through the slit.

Inside the cellular telephone, in order to operate the magnetic reader/writer operative and allow the user to select the data of a one credit card there is a controller of the magnetic reader/writer connected to the magnetic reader/writer, said controller for processing and storing electrical signals from the magnetic reader/writer and for instructing the magnetic reader/writer, said controller connected to the computer system of the cellular telephone including through a data bus to the central processing unit of the cellular telephone, and first software for operating the controller to process a keypad selection of a credit card whose data is to be written by the magnetic reader/writer on to the template credit card from among a plurality of credit cards whose data has been read by the magnetic/reader/writer.

In a second preferred embodiment, rather than a slit in the outer housing there is a slot. The slot both stores the template credit card and can be used to insert and remove the plurality of credit cards. Such insertion and/or removal constituting a swiping of the credit card since the direction of the slot is perpendicular to a direction of the slit. That is, if the slit would be along a long side of the outer housing, the opening for the slot would be along a short side of the outer housing. The slot is preferably formed by thickening an outer housing wall and then carving out space within this outer housing wall. The slot runs deeply enough across the body of the telephone to allow ample room for swiping.

IMPORTANT OBJECTS AND ADVANTAGES

The following important objects and advantages of the present invention are:

(1) to provide a method and apparatus for a universal credit card that combines a template credit card and a cellular telephone assembly;

(2) to provide such an assembly that houses everything needed within the outer housing of the cellular telephone and in certain embodiments in an area directly adjacent said outer housing;

(3) to provide such an assembly that employs a single housing shell;

(4) to provide a credit card and cellular telephone assembly that makes it unnecessary to carry around more than a single credit card in a wallet;

(5) to provide a method and apparatus for a universal credit card that does not require retail establishments to alter their existing card readers or to design new card readers or new software for such readers;

(6) to provide a method an apparatus for a universal credit card that does not require carrying around either a new device or a bulky device that one already has;

(7) to provide a method and apparatus for a universal credit card that achieves improved management of credit card purchases;

(8) to provide a credit card and cellular telephone assembly that expands the functionality of a cellular telephone;

(9) to provide a credit card and cellular telephone assembly that permits better management of personal finances;

(10) to provide a credit card and cellular telephone assembly that reduces the possibility of credit card theft and of identity theft;

(11) to provide a credit card and cellular telephone assembly that works with a standard-width credit card;

(12) to provide a credit card and cellular telephone assembly that allows to lower usage of plastic materials leading to advantageous ecological and environmental consequences;

(13) to provide a credit card and cellular telephone assembly that combines two necessities into a single convenient shell;

(14) to provide a credit card and cellular telephone assembly that makes it unnecessary for credit card companies issuing new cards to mail the card to consumers; the credit card company need only send the data associated with the new credit card or credit line through a telephone link to the cellular telephone of the consumer where it can be used in accordance with the method and apparatus of the present invention;

(15) to provide a method and apparatus of multiple credit card usage into a single card that eliminates credit card theft arising out of the mailing of newly issued cards to consumers;

(16) to provide a method and apparatus of a credit card and cellular telephone assembly that has a security feature in which the all in one credit card's data is maintained in a condition of blank data in case of loss or theft of the cellular telephone with which the template credit card is stored;

(17) to provide a method and apparatus for a universal credit card that does not require companies that issue credit cards to alter the physical nature of their existing credit cards; and

(18) to provide a method and apparatus for a universal credit card that does not require credit card companies to alter their existing methods of operation with respect to their own internal methods, their dealings with cardholders and/or their dealings with establishments that accept said credit cards.

DETAILED DESCRIPTION OF THE PREFERRED EMBODIMENT

Figure 2:
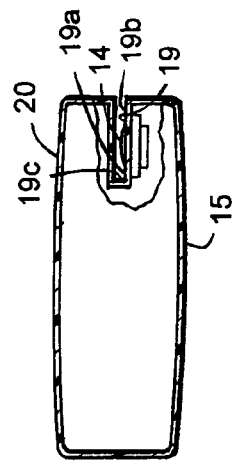
FIG. 2 is a sectional view of FIG. 1 along line 2—2 showing the magnetic reader/writer adjacent the slit in the apparatus of the present invention.

The apparatus of the present invention will now be illustrated by reference to the accompanying drawings. The credit card assembly of the present invention has been assigned reference numeral 10. Other elements have been assigned the reference numerals referred to below.

The term "plurality of credit cards" as used herein refers to all credit cards possessed by a consumer user that the user may wish to be able to use at some point in the future and hence it includes all credit cards whose data the user has decided to include in the assembly of the present invention.

As seen from FIGS. 1–5, a credit card and cellular telephone assembly 10 is presented for use with a cellular telephone 20 of the kind having a keypad, an outer housing, and a computer system. The term "computer system" as used herein includes the central processing unit, a data bus, an electronic memory storage and software. The cellular telephone portion of the assembly 10 may be made from any such model cellular telephone although as described below said cellular telephone has to be modified in size and components since it has to accommodate placement of certain additional parts of the assembly 10, and in particular, a magnetic reader/writer and the hardware and software needed to make such magnetic reader/writer operate.

Generally speaking, the cellular telephone's functionality and appearance are expected to look similar to cellular telephones commonly available in the market. Said cellular telephone 20 portion of assembly 10 includes a keypad 11, an outer housing 15, and any other electronic components commonly found in a conventional cellular telephone allowing said cellular telephone to function as a cellular telephone. One of said electronic components may be a computer system 13.

Outer housing 15 of the cellular telephone of the assembly 10 of the present invention is generally comprised of a top façade 15a or face, a bottom façade 15b (only barely visible in the drawings), a left side façade 15c, a right side façade 15d, a rear façade 15e and a front façade 15f. Typically, the keypad is on the front façade of the outer housing, unless it is on the lid in a model of the telephone that opens up with a lid.

Incorporated into the cellular telephone is a magnetic reader/writer 14. The magnetic reader/writer has one or more magnetic read/write heads and may be of the kind used in a magnetic card reader machine. Thus it has solenoids and/or anything else known in the art to read and write data from and to a magnetic strip (tape) on a credit card. The magnetic reader/writer 14 as used in the assembly 10 is very small so as not be overly increase the size and bulk of the outer housing 15 of the cellular telephone. Magnetic reader/writer 14 may be any suitable magnetic reader/writer capable of reading a magnetic strip of a credit card and be stored inside the housing of a cellular telephone. Magnetic reader/writer 14 is located inside the outer housing 15 of said cellular telephone part of said credit card assembly and may be positioned anywhere within said housing that allows said magnetic reader/writer 14 to interact electromagnetically, that is, i.e. read data from and/or write data to a magnetic strip on a credit card, and typically a standard width credit card. Since, as will be explained in further detail below, said credit card is in certain preferred embodiments going to be swiped in a slot in the outer housing or in a slit in the outer housing, in these preferred embodiments, the magnetic reader/writer should be located in the slit or the slot, as described more fully below. The magnetic reader/writer must be capable of reading data from and/or writing data to a magnetic strip of a standard-width credit card. In the preferred embodiment of where there is a slit in the outer housing, as best seen in FIG. 2, the magnetic reader/writer 14 is situated in the slit and close to a side of the outer housing 15 of said cellular telephone part, as described more particularly below.

In one preferred embodiment, the outer housing 15 has a slit 19 running along one of the facades of outer housing 15. In this case, the magnetic reader/writer 14 is positioned adjacent to the slit 19. In order for this design to be effective, slit 19 should have a width at least equal to a standard width of a credit card 16. Furthermore, the slit 19 may have a sufficient depth so that the credit card 16 could be inserted into the slit in a manner that would place the magnetic strip 17 of the credit card (or the magnetic strip 18a of template credit card 18) beyond the edge of the façade out of which the slit 19 is carved, and preferably deep enough to place the strip 19 (or strip 18a) beyond the inside wall of said façade. In the case of left side façade 15c or right façade 15d, that means beyond a vertical border of an inside wall of the left or right side façade (i.e. side) of the outer housing 15 of the cellular telephone part of the credit card assembly 10.

Figure 1:
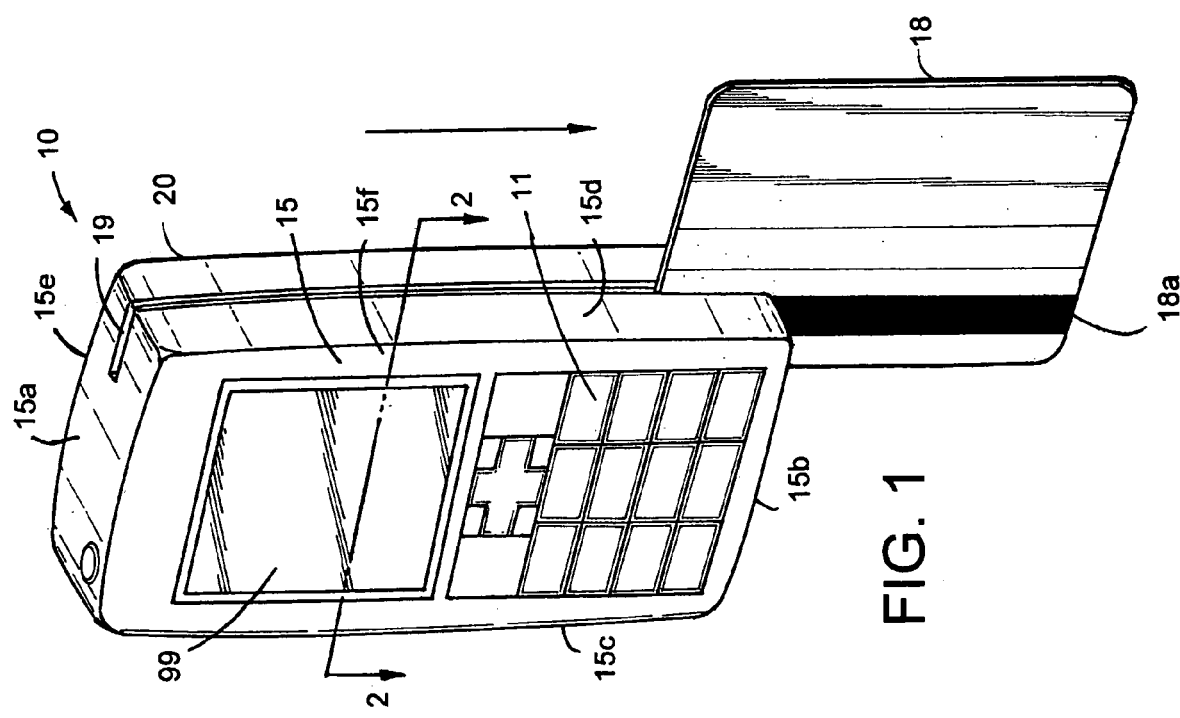
FIG. 1 is a perspective view of the credit card and cellular telephone assembly of the present invention showing a template credit card being swiped in the slit in the outer housing.

In a preferred embodiment, slit 19 runs along left side façade 15c or right side façade 15d, as shown in FIGS. 1–2,. However, it is contemplated by the present invention that slit 19 could run along top façade 15a or bottom façade 15b. Using top façade 15a or bottom façade 15b for slit 19 would be possible since even if the longest dimension of these facades were not long enough to accommodate the data portion of the magnetic strip 18a on template credit card 18 (or the data portion of the magnetic strip 17 of the credit card used from among the plurality of credit cards) said slit 19 is only used to guide the motion of the credit card through said slit 19 and there is no problem if the swiped card sticks out from the width of outer housing 15. Similarly, slit 19 can be carved into rear façade 15e or front façade 15f along a portion of said façades close by to left side façade 15c or right side façade 15d. However, in case rear façade 15e or front façade 15f is used for slit 19, since the slit 19 must be deep enough to accommodate magnetic strip 18a of template credit card 18 (and the magnetic strip 17 of each credit card among the plurality of credit cards), the thickness of the telephone 20 must accommodate such depth.

In this embodiment, the slit 19 is generally comprised of three slit walls. Two of the three slit walls, the two longer slit walls 19a, 19b run parallel to each other and parallel to the general direction of the slit 19 and the third slit wall 19c runs perpendicular to the first two slit walls 19a, 19b. Alternatively, there is no third slit wall and the two slit walls 19a, 19b simply guide the moving credit card or template credit card as it is swiped.

In a further preferred embodiment, as best appreciated from FIG. 2, the magnetic reader/writer 14 is positioned along one of the two slit walls 19a, 19b of the slit 19 in order to cross by and face or else lightly graze the moving magnetic strip of the swiped credit card as it is swiped, in the manner that is well know to those skilled in the art of magnetic strips and magnetic reader/writers.

The assembly, and in particular the portion inside the cellular telephone, includes a controller 90 which may house or be connected to the magnetic reader/writer 14. A controller is defined as a device that controls the transfer of data from a computer to a peripheral device and vice versa. In this case, the controller 90 is likely to be a single chip.

The controller 90 receives, processes and/or stores electrical signals coming from the magnetic reader/writer. The controller 90 thus instructs the magnetic reader/writer to perform according to the present invention. The controller 90 is connected to the computer system 13 of the cellular telephone 20 of the credit card assembly. In a preferred embodiment, such connection between the controller 90 and the computer system of the cellular telephone part is accomplished with a data bus 21 which links controller 90 with the central processing unit of the computer system of the cellular telephone 20.

In order to implement the method and apparatus of the present invention, assembly 10 also comprises a template credit card 18 which has a magnetic strip or stripe 18a. The magnetic strip 18a is capable of storing and/or deleting data at least one credit card 16. Using the functionalities, for example keypad 11, of cellular telephone 20 programmed with its software, referred to herein as first software, a user of the credit card assembly 10 can select the data from a credit card 16 previously read by magnetic reader/writer 14. The selection can be simply selecting the identity of a particular credit card. Once the user has inputted this selection, the data of that credit card 16 (from among the plurality of credit cards) may be written onto the magnetic strip 18a of the template credit card 18 and this is accomplished when template credit card is swiped through the slit 19 of the outer housing 15 of the credit card assembly 10. In certain embodiments, an additional selection step may be required by the user—namely, inputting the button for assigned to the function "Write Data" (as distinguished from "Read Data").

It is noted that in a preferred embodiment, first software of the assembly of the present invention is designed to accommodate the fact that prior to the user selecting the data from a credit card previously read by magnetic reader/writer 14, that user uses the keypad to input a password or other identification information to verify the user's identity.

In the preferred embodiments, the assembly 10 includes first software or a program which directs controller 90 to accept and/or store the data that was read by magnetic reader/writer 14 upon the swiping the credit cards among the plurality of credit cards (in this embodiment through slit 19). In particular, the software instructions or the program directs the controller 90 to process a keypad selection of a credit card from among a plurality of stored credit cards data which data is then written by magnetic reader/writer 14 to template credit card 18.

In a second preferred embodiment, rather than slit 19 in the outer housing there is a slot 12. The slot 12 is a thin plane defined by slot walls and is carved into one of the façades, 15a, 15b, 15c, 15d, 15e, 15f, of outer housing 15 to a sufficient depth to allow swiping of the credit card through the slot 12. Preferably, slot 12 is also used to store template credit card 18, although that is not absolutely necessary, but if storage is to be accomplished the depth of slot 12 would likely have to approach the length of the façade that the slot 12 is carved into. In a preferred embodiment, the most likely candidates among the six or so (phones with a lid can have a seventh façade) façades are rear façade 15e and front façade 15f of outer housing 15 since their surface area in many models of cellular telephones approaches that of a standard size credit card. However, it is contemplated by the present invention that left façade 15c, right façade 15d, or even top façade 15a or bottom façade 15b can be the façade into which slot 12 is carved. In the event the dimensions.

It is noted that cellular telephone 20 would have to be somewhat bigger that otherwise to accommodate assembly 10.

Slot 12 is substantially parallel to the façade that slot 12 is carved into. That is, although slot 12 does not have to be exactly parallel to the façade, the general direction of slot 12 is the same as the general direction of the façade that slot 12 is carved into.

Slot 12 is open on one side, that side preferably being the shorter dimension (i.e. width) of the back façade of the outer housing 15. Typically the credit card would thus be inserted into the slot 12 from the top or bottom façade of the telephone. Outer housing 15 has a rear façade, a front façade, and typically also a left façade, a right façade, a top façade and a bottom façade. The slot runs through a plane of one facade of the outer housing, typically the rear or front façade. The magnetic reader/writer is positioned adjacent one of the slot walls. The slot 12 has a width at least equal to, but in a preferred embodiment also approximately equal to, in order to minimize space, a standard width of a credit card. Slot 12 also has a sufficient depth so that insertion and/or removal of said credit card moves the magnetic strip of said credit card across the magnetic reader/writer. In order to accomplish this it is not necessarily required for slot 12 to be so deep that slot 12 runs the full length of the back (or front) façade of the outer housing.

Figure 4:
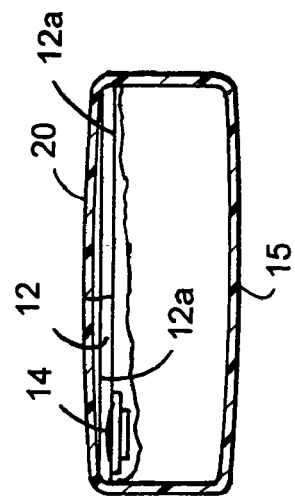
FIG. 4 is a sectional view of FIG. 3 along line 4—4 having the slot and showing the magnetic reader/writer in the slot in the apparatus of the present invention.
Figure 3:
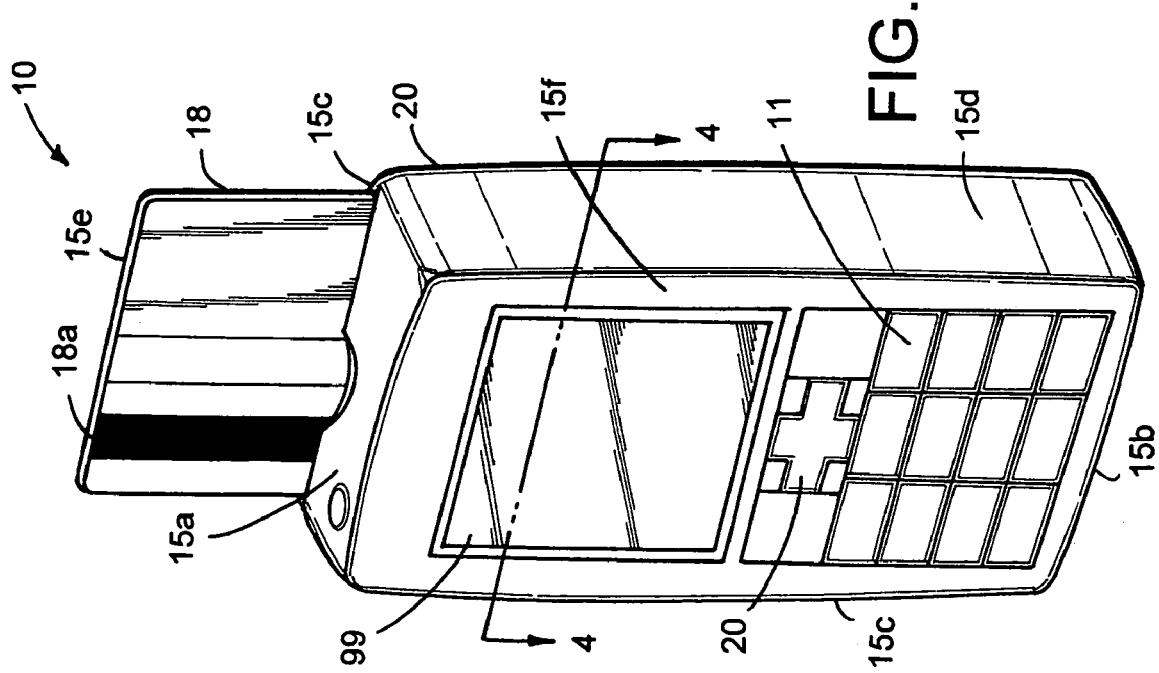
FIG. 3 is a perspective view of a first alternative embodiment of the credit card and cellular telephone assembly of the present invention showing a credit card being swiped in the slot of the outer housing.

As best seen from FIGS. 3–4, magnetic reader/writer 14 is positioned in slot 12 along a slot wall of slot 12 and in order to accommodate its purpose should be off to the side of the slot wall to ensure that that it is in the way of the path of the magnetic strip of the credit card moving through the slot 12. Magnetic strips of credit card are typically located off to the side in terms of the width dimension of the credit card, rather than being in the middle of the credit card. Lengthwise, however, in a preferred embodiment, the magnetic reader/writer 14 may be relatively centered within slot 12 along slot wall 12a or in whatever lengthwise position is ideally suited to its function, as those skilled in the art can readily recognize, just as it is positioned within a magnetic card reader.

Slot 12 can be used to both store the template credit card 18 and slot 12 can also be used to swipe the template credit card 18 and to swipe each credit card from among the plurality of credit cards. Swiping is done by removing, inserting or inserting and removing the credit card of the plurality of credit cards. Such insertion and/or removal constituting a swiping of the credit card since the direction of the slot is perpendicular to a direction of the slot. That is, if the slot would be along a long side of the outer housing, the opening for the slot would be along a short side of the outer housing. The slot is preferably formed by thickening an outer housing wall and then carving out space within this outer housing wall. The slot runs deeply enough across the body of the telephone to allow ample room for swiping.

In certain preferred embodiments, when the template credit card 18 is stored in slot 12, the mere act of removing the template credit card 18 would constitute the swiping of said template credit card 18 since the magnetic strip 18a would run across the embedded magnetic reader/writer 14 in the slot 12.

With respect to the swiping of the regular credit cards 16 of the plurality of credit cards in slot 12 in order to have the magnetic reader/writer read data from said credit cards, these cards are not typically stored in slot 12. Hence, their swiping is accomplished either by their insertion into slot 12 alone, in which case their removal leaves the data stored in the cellular telephone unchanged, or alternatively their swiping can be accomplished by the combination of their insertion and removal. The precise mechanism of swiping the credit cards of the plurality of credit cards in slot 12 is determined by how first software of assembly 10 and computer system of cellular telephone 20 are set up, something well within the knowledge of those skilled in the art. In certain embodiments, the swiping of the credit cards 16 of the plurality of credit cards can be preceded by an appropriate selection on the keypad by the user of a button or other inputting element that activates the function of "Read Data". This way, insertion of the credit card 16 in slot 12 (which necessarily forces its magnetic strip 17 to cross magnetic reader/writer 14) causes a reading of data and then removal of the credit card 17 causes nothing new to happen or causes the same data to be read again, since no new selection was made.

Furthermore, in certain preferred embodiments, whether the template credit card is stored in the slot 12 or is maintained separately, as a security feature of the assembly of the present invention in case of loss of the cellular telephone, when template credit card 18 is re-inserted into slot 12 (or in theory if template credit card were inserted for the first time if somehow there was data on template credit card 18 already), or in embodiments where there is a slit 19 instead of slot 12, when template credit card 18 is swiped in the slit 19, then in each of these cases template credit card 18 automatically loses data and converts to a state of blank data since the act of re-insertion is a swiping of the template credit card 18 across magnetic reader/writer 14. This erasing of the data on template credit card 14 only occurs if the user previously hit the appropriate button (or inputting instrument) on keypad 11 to select the function "CLEAR" or its equivalent (the same way the user selects which card's data to activate). Thus the first software of the assembly of the present invention is designed to instruct the magnetic reader/writer 14 to "erase" or write blank data over existing data upon selection of the "clear" function followed by insertion of template credit card 18 back into slot 12 or followed by swiping template credit card 18 in slit 19. This feature means that template credit card 18 would provide no identifying or other information to a thief or hostile party if ever found.

Figure 6:
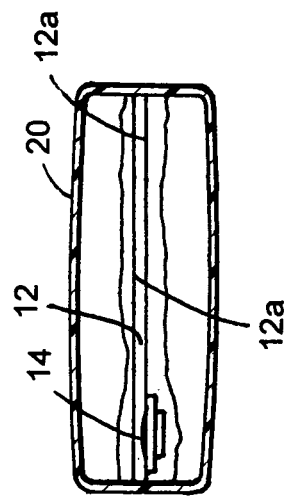
FIG. 6 is a sectional view of FIG. 5 along line 6—6 having the slot and showing the magnetic reader/writer in the slot in the apparatus of the present invention.
Figure 5:
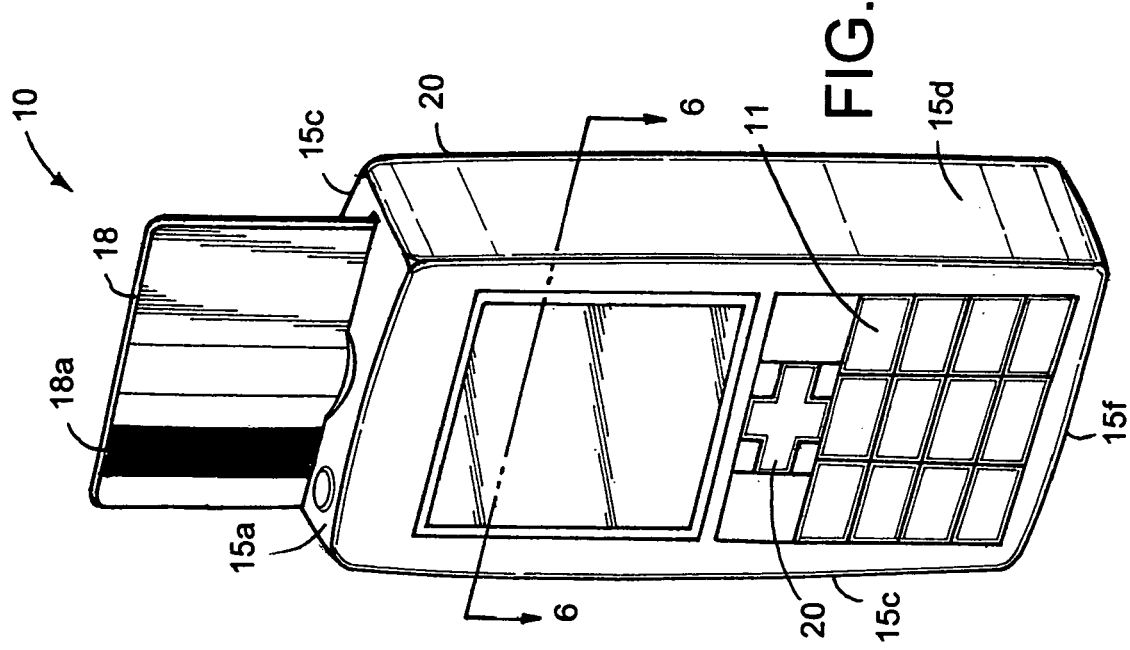
FIG. 5 is a perspective view of a second alternative embodiment of the credit card and cellular telephone assembly of the present invention showing a credit card being swiped in the slot of the outer housing.
Figure 7:
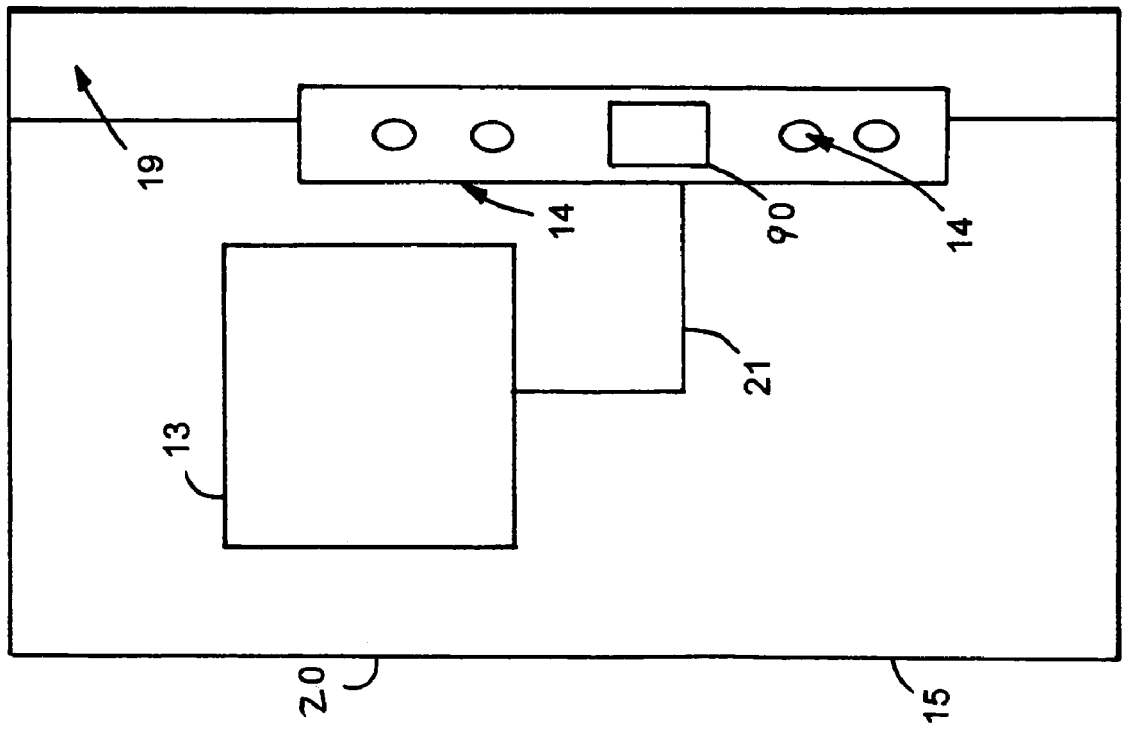
FIG. 7 is a schematic of the computer system and other key parts of the credit card and cellular telephone assembly of the present invention.

In a second version of the preferred embodiment containing slot 12, the slot 12 is not located within a façade of the outer housing, for example within the rear façade, but rather is located in a middle of the width of the telephone, that is somewhere between the rear façade and the front facade. An example of this embodiment is depicted in FIGS. 5–6. This embodiment would be much less appealing from a design point of view if it intrudes into the internal components of the cellular telephone. Accordingly, in this embodiment slot 12 should be adjacent to rear façade 15e or front façade 15f of outer housing 15. Thus, although FIGS. 5–6 depict slot 12 as being smack in the middle of the width of the telephone, this is merely illustrative of the idea that slot 12 is between the rear and front facades 15e, 15f of outer housing 15. In fact, in this version slot 12 is actually most preferably adjacent the inside wall of rear façade 15e or adjacent the inside wall of front façade 15f to avoid interfering with the electric and other components within cellular telephone.

In a further preferred embodiment, the template credit card 18 can be attached for storage purposes to the rear façade 15e (or in theory front façade 15f) of cellular telephone 20. The use of front façade 15f for storing template credit card 18 would seem logical in those models of cellular telephone 20 having a lid that opens via a hinge or other means. Then the lid's façade can be separated from the front surface of the cellular telephone 20 and the stored template credit card 18 would not interfere with use of keypad 11 or display 99. The storage means can be anything suitable, from adhesive to a clip or anything else that is suitable and known to those skilled in the art of fastening plastic to cellular telephones. Alternatively, of course, the template credit card 18 can simply be stored by the user separately from the cellular telephone 20, preferably on something carried by the user all the time, i.e. a keychain.

Using the method and apparatus of the present invention, namely the credit card and cellular telephone assembly, it would no longer be necessary for credit card companies issuing new cards to mail the newly issued credit card to the consumers. Rather, the credit card company need only send the data associated with the newly issued credit card or credit line through a telephone link to the cellular telephone 20 of the consumer where that data can be used in accordance with the method and apparatus of the present invention. Alternatively, the credit card company can send said data associated with the newly issued credit card or credit line through a telecommunications network, such as the Internet, where it can be accessed by the user.

In the method of the present invention the steps would include (i) providing a credit card and cellular telephone assembly of the present invention, (ii) successively swiping in the slit (or slot) each credit card of the plurality of credit cards that one wants to be included in the assembly, (iii) using the keypad to select data from a credit card from among the plurality of credit cards, and (iv) swiping the template credit card in the slit (or slot) to read the selected data on to the template credit card. Step (iii) is typically performed at the point of purchase but may be performed at any time.

Then, after step (iv), template card credit card 18 is presented to the clerk of the retail or other establishment and used like any credit card. That is, it is swiped in the clerk's card reader, etc.

In a preferred embodiment, prior to the step of using the keypad to select data from a credit card from among the plurality of credit cards, the user first uses the keypad to input/enter a password or input other identification information to verify the user's identity.

Other variations of the above embodiments can be easily imagined and still be within the scope and spirit of the present invention. For example, slot walls of slot 12, and similarly slit walls 19a, 19b of slit 19 can have well chosen apertures thus allowing magnetic reader/writer 14 to be attached to an inside portion of said slot wall or slit wall. This would still allow the magnetic strip 17 or 18a to pass by the magnetic reader/writer 14 without there being anything but air between the strip 17 or 18a and the magnetic reader/writer 14. Thus, although present technology may require the magnetic strip to actually contact the magnetic reader/writer 14, future technology may allow the competent operation of said magnetic reader/writer 14 without such contact. Thus, further configurations, not presently specified may easily be imagined to accomplish the purpose and objectives of the present invention.

It is noted that in some preferred embodiments the template credit card 18 used in the method and apparatus of the present invention may have on the back of the template credit card a standard area for a user's signature. Furthermore, said template credit card 18 has, in certain preferred embodiments, a designated space for placement or engrafting of a photograph of the user on the front (or back) of said template credit card 18.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A credit card and cellular telephone assembly for use with a cellular telephone of the kind having a keypad, an outer housing, and a computer system, said computer system including a central processing unit, a data bus, an electronic memory storage and software, the assembly comprising:

the cellular telephone, said cellular telephone also including a magnetic reader/writer capable of reading data from a magnetic strip of a standard-width credit card, the outer housing having a slit running along a side of said outer housing, the slit having a width at least equal to a standard width of a credit card, the slit also having a sufficient depth so that the credit card can be inserted into the slit in a manner that places the magnetic strip of said credit card beyond a vertical border of an inside wall at the side of the outer housing, the magnetic reader/writer positioned adjacent a slit wall of the slit, a template credit card having a magnetic strip, the magnetic strip of said template credit card capable of storing and deleting data from at least one credit card selected from a plurality of credit cards when the template credit card is swiped through the slit, a controller of the magnetic reader/writer connected to the magnetic reader/writer, said controller for processing and storing electrical signals from the magnetic reader/writer and for instructing the magnetic reader/writer, said controller connected to the computer system of the cellular telephone including through a data bus to the central processing unit of the cellular telephone, and first software for operating the controller to process a keypad selection of a credit card whose data is to be written by the magnetic reader/writer on to the template credit card from among a plurality of credit cards whose data has been read by the magnetic/reader/writer.

2. The assembly of claim 1, wherein the template credit card has a width of a standard credit card.

3. The assembly of claim 1, wherein the slit runs along a left side façade of the outer housing or a right side façade of the outer housing.

4. The assembly of claim 1, wherein the first software is also for operating the controller to process a keypad selection of a "clear" function that is followed by an insertion of the template credit card into the slit to erase data on the template credit card.

5. A method of operating an all in one credit card through a cellular telephone, comprising:
(i) providing a credit card and cellular telephone assembly that uses a cellular telephone of the kind having a keypad, an outer housing, and a computer system, said computer system including a central processing unit, a data bus, an electronic memory storage and software, the assembly including:
the cellular telephone, said cellular telephone also including a magnetic reader/writer capable of reading data from a magnetic strip of a standard-width credit card,
the outer housing having a slit running along a side of said outer housing, the slit having a width at least equal to a standard width of a credit card, the slit also having a sufficient depth so that the credit card can be inserted into the slit in a manner that places the magnetic strip of said credit card beyond a vertical border of an inside wall at the side of the outer housing,
the magnetic reader/writer positioned adjacent to a slit wall of the slit,
a template credit card having a magnetic strip, the magnetic strip of said template credit card capable of storing and deleting data from at least one credit card selected from a plurality of credit cards when the template credit card is swiped through the slit,
a controller of the magnetic reader/writer connected to the magnetic reader/writer, said controller for processing and storing electrical signals from the magnetic reader/writer and for instructing the magnetic reader/writer, said controller connected to the computer system of the cellular telephone including through a data bus to the central processing unit of the cellular telephone, and
first software for operating the controller to process a keypad selection of a credit card whose data is to be written by the magnetic reader/writer on to the template credit card from among a plurality of credit cards whose data has been read by the magnetic/reader/writer
(ii) successively swiping each credit card of the plurality of credit cards in the slit,
(iii) using the keypad to select data from a credit card from among the plurality of credit cards, and
(iv) swiping the template credit card in the slit to write the selected data on to the template credit card.

6. The method of claim 5, wherein providing the assembly means providing such an assembly in which the template credit card has a width of a standard credit card.

7. The method of claim 5, wherein providing the assembly means such an assembly in which the slit runs along a left side façade of the outer housing or a right side façade of the outer housing.

8. The method of claim 5, wherein prior to using the keypad to select data from a credit card from among the plurality of credit cards, a user first uses the keypad to enter identifying information to verify said user's identity.

9. The method claim 5, including the steps of using the keypad to select a "clear" function and then inserting the template credit card in the slot to erase selected data from the template credit card.

10. A credit card and cellular telephone assembly for use with a cellular telephone of the kind having a keypad, an outer housing, and a computer system, said computer system including a central processing unit, a data bus, an electronic memory storage and software, the assembly comprising:
the cellular telephone, said cellular telephone also including a magnetic reader/writer capable of reading data from a magnetic strip of a standard-width credit card,
the outer housing including multiple facades and having a slot substantially parallel to a plane of one facade of the multiple facades of said outer housing, the slot having slot walls, the magnetic reader/writer positioned adjacent one of the slot walls and having a width at least equal to a standard width of a credit card, the slot also having a sufficient depth so that insertion and/or removal of said credit card moves the magnetic strip of said credit card across the magnetic reader/writer,
a template credit card having a magnetic strip, the magnetic strip of said template credit card capable of storing and deleting data from at least one credit card selected from a plurality of credit cards when the template credit card is inserted into and/or removed from the slot,
a controller of the magnetic reader/writer connected to the magnetic reader/writer, said controller for processing and storing electrical signals from the magnetic reader/writer and for instructing the magnetic reader/writer, said controller connected to the computer system of the cellular telephone including through a data bus to the central processing unit of the cellular telephone, and
first software for operating the controller to process a keypad selection of a credit card whose data is to be written by the magnetic reader/writer on to the template credit card from among a plurality of credit cards whose data has been read by the magnetic/reader/writer.

11. The assembly of claim 10, wherein the slot runs through a plane of the one façade.

12. The assembly of claim 11, wherein the slot runs through a plane of the rear façade or through a plane of the front façade of the outer housing.

13. The assembly of claim 10, wherein the first software is also for operating the controller to process a keypad selection of a "clear" function that is followed by an insertion of the template credit card into the slit to erase data on the template credit card.

14. The assembly of claim 10, wherein the template credit card has a width of a standard credit card.

15. The assembly of claim 11, wherein the template credit card has a width of a standard credit card.

16. The assembly of claim 12, wherein the template credit card has a width of a standard credit card.

17. A method of operating an all in one credit card through a cellular telephone, comprising:
   (i) providing a credit card and cellular telephone assembly that uses a cellular telephone of the kind having a keypad, an outer housing, and a computer system, said computer system including a central processing unit, a data bus, an electronic memory storage and software, the assembly including:
   the cellular telephone, said cellular telephone also including a magnetic reader/writer capable of reading data from a magnetic strip of a standard-width credit card,
   the outer housing including multiple facades, the outer housing having a slot substantially parallel to a plane of one facade of the multiple facades of said outer housing, the slot having slot walls, the magnetic reader/writer positioned adjacent one of the slot walls and having a width at least equal to a standard width of a credit card, the slot also having a sufficient depth so that insertion and/or removal of said credit card moves the magnetic strip of said credit card across the magnetic reader/writer,
   a template credit card having a magnetic strip, the magnetic strip of said template credit card capable of storing and deleting data from at least one credit card selected from a plurality of credit cards when the template credit card is inserted into and/or removed from the slot,
   a controller of the magnetic reader/writer connected to the magnetic reader/writer, said controller for processing and storing electrical signals from the magnetic reader/writer and for instructing the magnetic reader/writer, said controller connected to the computer system of the cellular telephone including through a data bus to the central processing unit of the cellular telephone, and
   first software for operating the controller to process a keypad selection of a credit card whose data is to be written by the magnetic reader/writer on to the template credit card from among a plurality of credit cards whose data has been read by the magnetic/reader/writer,
   (ii) successively swiping each credit card of the plurality of credit cards in the slot,
   (iii) using the keypad to select data from a credit card from among the plurality of credit cards, and
   (iv) swiping the template credit card in the slot to write the selected data on to the template credit card.

18. The method of claim 17, wherein providing the assembly means providing such an assembly in which the slot runs through a plane of the one façade.

19. The method of claim 18, wherein providing the assembly means providing such an assembly in which the slot runs through a plane of the rear façade or through a plane of the front façade of the outer housing.

20. The method of claim 17, wherein providing the assembly means providing such an assembly in which the template credit card has a width of a standard credit card.

21. The method of claim 18, wherein providing the assembly means providing such an assembly in which the template credit card has a width of a standard credit card.

22. The method of claim 19, wherein providing the assembly means providing such an assembly in which the template credit card has a width of a standard credit card.

23. The method of claim 17, wherein prior to using the keypad to select data from a credit card from among the plurality of credit cards, a user first uses the keypad to enter identifying information to verify said user's identity.

24. The method claim 17, including the steps of using the keypad to select a "Clear" function and then inserting the template credit card in the slot to erase selected data from the template credit card.

25. The method of claim 17, wherein successively swiping each credit card of the plurality of credit cards in the slot is accomplished by selecting on the keypad a "write data" function and then inserting and removing the credit card.

26. The method of claim 17, wherein successively swiping each credit card of the plurality of credit cards in the slot is accomplished by selecting on the keypad a "write data" function and then inserting the credit card.

* * * * *